W. Z. DAFOE,
Assignor of one-half to C. W. & W. W. MARSH.
WIRE STRETCHER.
No. 9,817. Reissued July 19, 1881.
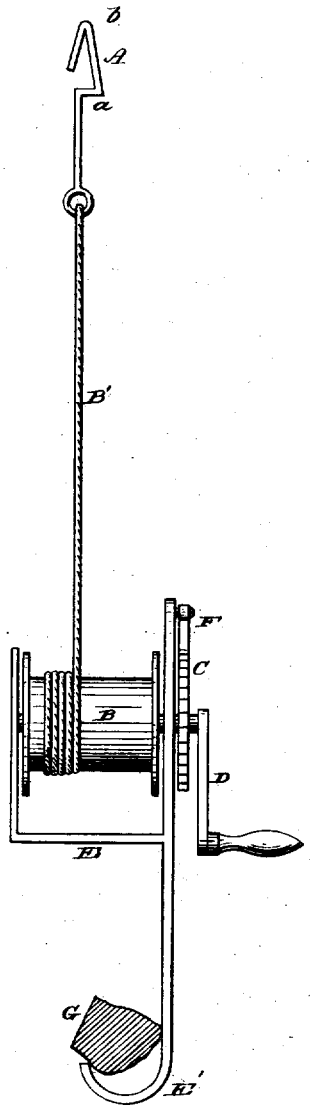
Witnesses
N. N. Low
J. S. Barker
Inventor:
William Z. Dafoe.
by Doubleday and Bliss
attys
N. PETERS, Photo-Lithographer, Washington, D. C.

UNITED STATES PATENT OFFICE.

WILLIAM Z. DAFOE, OF SYCAMORE, ILLINOIS, ASSIGNOR OF ONE-HALF TO CHARLES W. MARSH AND WILLIAM W. MARSH, OF SAME PLACE.

WIRE-STRETCHER.

SPECIFICATION forming part of Reissued Letters Patent No. 9,817, dated July 19, 1881.

Original No. 192,572, dated July 3, 1877. Application for reissue filed June 10, 1881.

*To all whom it may concern:*

Be it known that I, WILLIAM Z. DAFOE, a citizen of the United States, of Sycamore, in the county of De Kalb and State of Illinois, have invented certain new and useful Improvements in Wire-Stretchers; and I do hereby declare the following is a full, clear, and exact description of the invention, that will enable others skilled in the art to which it appertains to make and use the same, reference being had to the accompanying drawing, and to letters of reference marked thereon, which form a part of this specification.

The object of this invention is to provide a device which can be applied to fence-wires for the purpose of tightening or straining them either in repairing old fences or in constructing new; and its nature consists in providing a hook which will grasp and hold the wire without coiling or bending it around said hook; in connecting the hook to a windlass by a rope, so that the unstrained portion of the wire will be left free; and in the arrangement of the windlass in a frame provided with means that permit it to be attached to a post of any form and in any position on the post.

The figure is a plan view, and A represents the hook, which is provided with a shoulder or projection, *a*, and its interior is so formed that it approaches a sharp angle, *b*.

B′ represents the rope; B, the windlass; C, the ratchet-wheel; D, crank; E, frame; E′, frame-hook; and F, pawl.

The hook A is made of steel, and has its upper and lower faces flat, so as to present sharp edges at the angles *b*.

The frame E is made of wrought-iron, and the hook E′ is most conveniently made by curving a portion of the frame as shown, but it may, however, be made of a separate piece and pivoted to the frame E.

The windlass B is most conveniently made of cast-iron, but it may, if desired, be made partly of wood, and it is provided at the outside of the frame with a winding-crank and an ordinary ratchet-wheel and pawl, as shown.

In use, the wire is brought through the angular portion of the hook and over or under the shoulder or projection *a*. The angle of the hook firmly clasps the wire without coiling or bending it, so that the unstrained portion is left free for fastening to a post or for attaching additional lengths of wire, instead of being wound onto the windlass, as has been heretofore practiced.

The frame E is attached to a post represented at G, when the windlass is ready to be wound, and when wound the ratchet holds the wire taut until the staples are driven into the posts, or the wire otherwise fastened, and in this position, if desired, the free end may also be attached to the post supporting the tighteners. This operation is greatly facilitated by using a rope for winding upon the windlass, instead of using the wire. Whenever greater power is desired the rope B′ may be doubled and have one of its ends tied to the frame, and the other in position to be wound upon the windlass. In this case the hook will be attached to the rope by a sheave or small pulley-block.

What I claim is—

1. In a wire-stretcher, the combination of the following elements, namely: a wire-holder which grasps the wire without bending it, a flexible draft-connection, B′, separate from the wire, a windlass for winding said flexible draft-connection B′, a crank, D, a ratchet, C, a pawl, F, and a frame which supports the windlass and which is adapted to be made stationary, substantially as set forth.

2. In a portable wire-stretcher, the combination of a rope or flexible draft-connection separate from the wire, a wire-holder, a frame adapted to be temporarily connected to a post and to be detached therefrom, and a mechanism supported on said frame for winding said rope, substantially as set forth.

3. In a portable wire-stretcher, the combination of the rope separate from the wire, a wire-holder, a winding mechanism, and a frame having a cross-bar with arms projecting in one direction from said bar to support the winding mechanism, and a single arm projecting in the opposite direction from one side of the frame, the other side of the frame being free, substantially as set forth.

4. In a portable wire-stretcher, the combination of a windlass, a frame for supporting said windlass, a rope between the windlass and the wire, a wire-holder, and a device for fastening the frame, which device is permanently secured at one point only to said frame, whereby it may be fastened to posts of various shapes and sizes by passing the fastening device laterally around the posts, substantially as set forth.

5. In a portable wire-stretcher, the combination of a rope separate from the wire, a wire-holder, a revolving rope-winder, and a frame having a cross-bar and arms projecting from said bar for supporting the rope-winder, and also a grappling-arm which projects from one side of the frame and carries a hook for engaging directly with a post, the other side of the frame being left free, substantially as set forth.

6. The hook A, having the angle or projection *a*, and the opening having a sharp angle, *b*, for holding the wire without winding or bending, substantially as specified.

7. The combination of the frame E, having a hook, E′, with the windlass B, provided with a crank and ratchet-wheel and pawl, rope B′, and hook A, all constructed and operating substantially as and for the purpose set forth.

In testimony whereof I affix my signature in presence of two witnesses.

WILLIAM Z. DAFOE.

Witnesses:
JAMES L. MILLAR,
CHAS. WHITNEY.